United States Patent [19]

Walter et al.

[11] 4,387,939
[45] Jun. 14, 1983

[54] MULTI-PART ROLLING BEARING CAGE WITH SNAP FIT INTERCONNECTION

[75] Inventors: Lothar Walter; Armin Olschewski; Klaus Kispert, all of Schweinfurt; Hans Meining, Dittelbrunn, all of Fed. Rep. of Germany

[73] Assignee: SKF Kugellagerfabriken GmbH, Schweinfurt, Fed. Rep. of Germany

[21] Appl. No.: 287,900

[22] Filed: Jul. 29, 1981

[30] Foreign Application Priority Data

Aug. 2, 1980 [DE] Fed. Rep. of Germany ... 8020776[U]

[51] Int. Cl.³ .......................................... F16C 33/46
[52] U.S. Cl. .................................... 308/217; 308/201
[58] Field of Search ............... 308/217, 201, 218, 202, 308/188, 207 R, 189 R

[56] References Cited

U.S. PATENT DOCUMENTS 1,464,666  8/1923  Slater .
2,591,161  4/1952  Kilian .................................... 308/217
4,054,340  10/1977  Broshkevitch et al. ............. 308/217
4,174,870  11/1979  Kispert et al. ....................... 308/217

*Primary Examiner*—Lenard A. Footland
*Attorney, Agent, or Firm*—Daniel M. Rosen; J. David Dainow

[57] ABSTRACT

A cage for a rolling bearing is formed of a plurality of cage parts. One of the cage parts is comb shaped, having axially extending cross-pieces adapted to be engaged by another cage piece, which may be a ring. Axially extending projections with enlarged ends are provided on the cage ring, at the inner circumference thereof, engaging correspondingly shaped recesses in the other cage part, thereby to enable snapping of the cage parts together. Recesses or projections are provided on the end of each cross-piece of the comb-shaped part, for engaging corresponding projections or recesses in the side ring of the cage, thereby to stabilize the cage in the circumferential and radial directions.

9 Claims, 5 Drawing Figures

MULTI-PART ROLLING BEARING CAGE WITH SNAP FIT INTERCONNECTION

BACKGROUND OF THE INVENTION

This invention relates to a rolling bearing cage, especially for cylindrical roller bearings, in which the cage is formed of two or more parts held together by a snap connection.

It is known to provide a cage for a rolling bearing, comprised of a comb-shaped part and a slit closing ring, the closing ring being adapted to be snapped into recesses in the cross-pieces of the cage. Such an arrangement is disclosed, for example, in U.S. Pat. No. 1,464,666. It is possible for the slit closing ring of this cage to spring from its interconnection with the other cage part in the event of high bearing loads.

It is also known to snap large closing elements on the ends of the cross-pieces of the comb-shaped part of the cage. (U.S. Pat. No. 2,591,161) The cross-pieces of this cage, however, have no stability in the circumferential direction, so that under high bearing loads the cross-pieces of the cage may be deformed.

The invention is therefore directed to the provision of a multi-part cage for a rolling bearing, wherein the parts of the cage are held together by a snap connection, and wherein the cross-pieces of the cage are held in the radial as well as circumferential directions even under high bearing loads. The invention is also directed to the provision of a bearing cage of the above type wherein the interconnection of the bearing parts is not lost in the event of high revolution speed of the bearing.

SUMMARY OF THE INVENTION

Briefly stated, in accordance with the invention, recesses are provided in the bore of one cage part, and elastic projections of another cage part extend into such recesses. The projections are snap fit in the recesses. Centrifugal forces acting on the projections force them radially outward, into stronger contact with their respective recesses, so that the snap interconnection of the cage part is not lost under such conditions. In addition, improved stabilization of the cage is effected by the provision of axially extending projections on one cage part, at the ends of the cross-pieces, received by recesses in the other respective cage part, so that the cross-pieces of the cage will not be deformed in operation.

DESCRIPTION OF THE DRAWINGS

In order that the invention will be more clearly understood, it will now be disclosed in greater detail with reference to the accompanying drawings, wherein.

DETAILED DESCRIPTION OF THE PRESENT INVENTION

Figure 1:
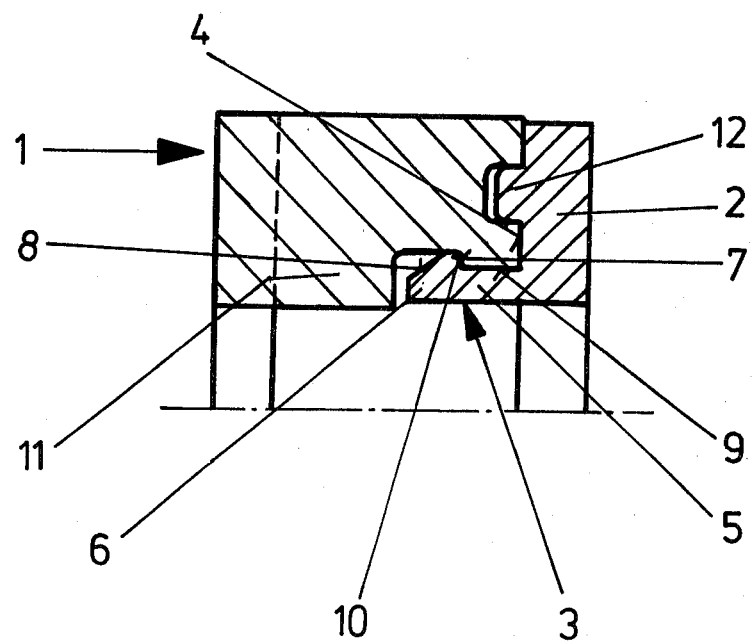
FIG. 1 is a cross-sectional view of a two part cage for cylindrical rollers according to the invention.
Figure 2:
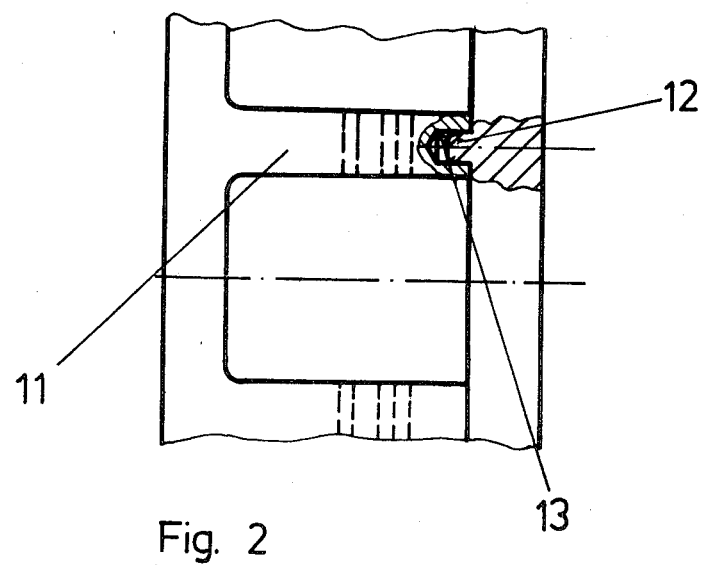
FIG. 2 is a view of a development of the cage illustrated in FIG. 1.

Referring now to the drawings, and more in particular to FIGS. 1 and 2, therein is illustrated a cage for cylindrical rollers, comprised of a comb part 1 and side ring 2, these two elements being connected together by a snap connection. The snap connection is obtained by means by axially directed elastic projections 3 extending from a surface 4 of the side ring toward the comb part 1. In the illustrated embodiment of the invention, the projections 3 extend axially from the radially inner portion of the side surface 4 of the side ring, and have, for example, rectangular cross-section portions adjoining the side ring. The ends of the projections 3 have heads with a radially extending rear surface portion 7, i.e., on the side of the head part toward the side ring. The head parts 6 of the elastic projections 3 have beveled ends, on their radially outer surfaces, the head parts adapted to engage corresponding recesses 9 in the bore of the comb part 1. During assembly, the side ring 2 is urged axially with respect to the comb part 1 whereby the projections 3 are forced radially inwardly. As soon as the side ring has reached its final position, the head parts 6 of the projections spring radially outwardly into enlarged end portions of the recesses 9, so that the radially extending rear sections 7 engage correspondingly shaped surfaces 10 of the comb part 1. The elastic projections 3 thereby serve the function of holding the cage parts 1 and 2 together in the axial direction. In the above arrangement, the interconnection of the cage elements is strengthed during high turning speeds of a bearing incorporating the cage, since the elastic projections 3 are forced radially outwardly against the cage cross-pieces 11 by centrifugal force. In order to stabilize the cage cross-pieces 11 in the radial and circumferential directions, the facing side 4 of the side ring 2 toward the comb part 1 is provided with a plurality of circumferentially distributed pins 12, the pins 12 engaging corresponding recesses 13 in the facing ends of the cross-pieces 11.

Figure 3:
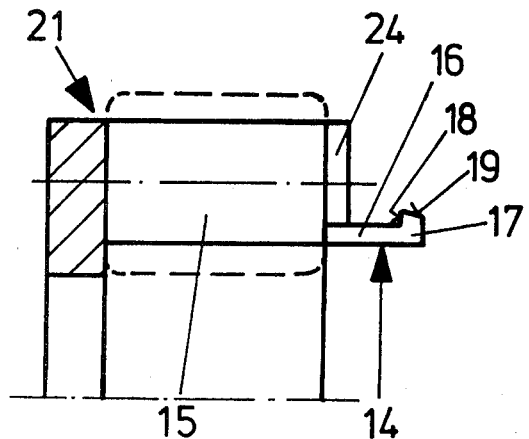
FIG. 3 is the front view of the comb part of another modification of the invention.
Figures 4, 5:
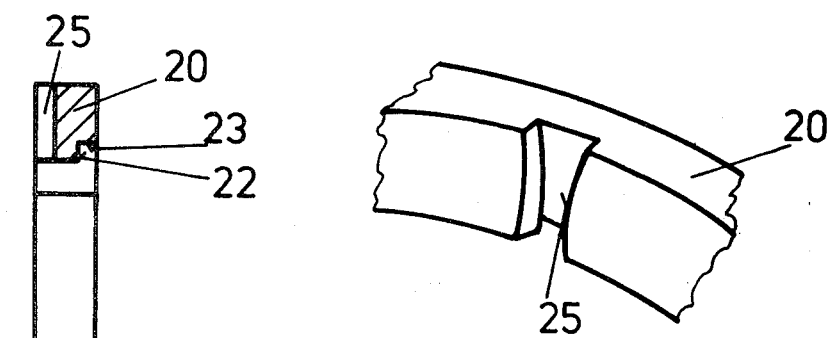
FIG. 4 is a cross-sectional view of a side ring for the comb part of FIG. 3.
FIG. 5 is a perspective view of a portion of the side ring of FIG. 4.

In the embodiment of the invention illustrated in FIGS. 3-5, the cage for cylindrical rollers is provided with elastic projections 14 extending from the ends of the cross-pieces 15 of the comb part thereof, the projections extending axially from the radially inner end surfaces of the cross-pieces. The projections 14, in the region adjoining the cross-pieces 15, may have rectangular cross-sections, the projections terminating in heads 17. As in the embodiment of FIGS. 1 and 2, the heads 17 have radially directed rear surfaces 18, i.e., toward the ends of the cross-pieces, as well as bevelled surfaces 19 at the radially outer ends of the heads 17. The greatest diameter portion of the projections, i.e., at the heads 17, is greater than the diameter of the side rings 20 at the bottom of the axially extending grooves therein, the projections 14 being adapted to be inserted in the grooves of the side ring 20. When the elastic projections of the comb part 21 are initially pushed axially into the corresponding grooves of the side rings 20, they are forced radially inwardly, until the facing surfaces of the side ring 20 and the cross-pieces 15 engage. At this position, the projections 14 spring radially outwardly so that the rear surfaces 18 of the projections engage corresponding radially extending surfaces 22 formed in the side ring 20. The heads 17 of the elastic projections 14 thus engage corresponding recesses 23 of the side ring, one axially end of the recesses 23 forming the holding surfaces 22. In order to stabilize the cross-pieces 15 in the circumferential direction, for example, a radially directed projection 24 is provided on the end of each of the cross-pieces. The projection 24 engages corresponding groove 25 in the facing surfaces of the side ring 20 with minimum play.

A typical bearing roller is shown in dashed lines in FIG. 3.

It will be understood that the invention is not limited to the above disclosed embodiments. There are thus many changes in the structure that may be made, without departing from the invention. For example, the cage may be formed of two comb-shaped parts, whereby the cross-pieces of the cage extend alternately from the two comb-shaped parts. The cross-pieces of the separate comb parts are provided with elastic projections and/or recesses as above described, for holding the comb-shaped parts together. The cage parts in accordance with the invention may be formed of either plastic or metal.

What is claimed is:

1. A multi-part cage for the rolling elements of a rolling bearing, comprising first and second adjoining cage parts having central bores, said first part having axially extending recesses at its inner surface, said second part having axially extending projections received in said recesses, said recesses and projections having engaging radially extending surfaces inhibiting separation of said first and second parts, said first and second parts having further mutually engaging axially extending recesses and projections spaced from the inner circumference thereof.

2. The cage of claim 1 wherein said first mentioned projections have rectangular cross-sections at their bases, and terminate in head parts defining said radially extending surfaces thereon.

3. The cage of claim 1 wherein said first cage part comprises a comb-shaped part having axially extending cross-pieces, said further recesses and projections being aligned with the free ends of said cross pieces.

4. The cage of claim 3 wherein said second cage part comprises a side ring having a surface axially abutting said free ends of said cross-pieces, said first mentioned projections extending axially from the radially inner portions of said surface.

5. The cage of claim 1 wherein said further recesses are provided in one of said cage parts, and said further projections comprise pins extending axially from the other cage parts.

6. The cage of claim 1 wherein said first part comprises a comb-shaped part with axially extending cross-pieces, said first mentioned recesses being formed in the radially inner surfaces of said cross-pieces.

7. The cage of claim 1 wherein said second cage part comprises a comb-shaped part having axially extending cross-pieces with free ends adapted to engage said first cage part, said further projections comprising radially extending projections on said ends of said cross-pieces and adapted to engage similar recesses in the facing side of said first cage part.

8. The cage of claim 1 wherein said second cage part comprises a comb-shaped part having axially extending cross-pieces, said first mentioned projections extending axially from the free ends of said cross-pieces.

9. The cage of claim 8 wherein said first cage part comprises an annular ring having one side abutting said ends of said cross-pieces, said ring having recess means on the other side thereof receiving said cross-piece projections.

* * * * *